March 16, 1926.
E. E. LINDSEY ET AL
1,576,664
MANUFACTURE OF BREAD COMPOUND
Filed Feb. 11, 1925    2 Sheets-Sheet 1
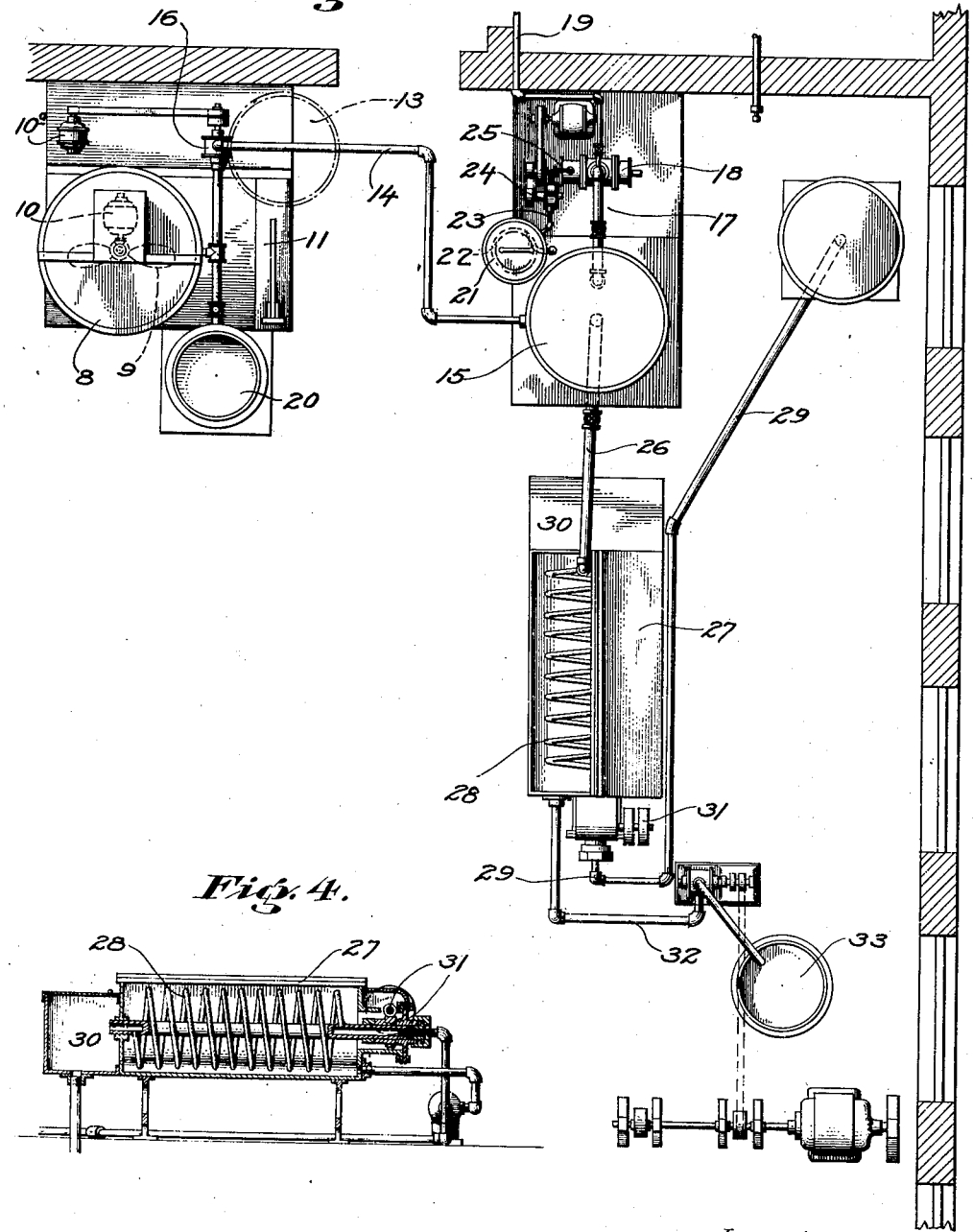
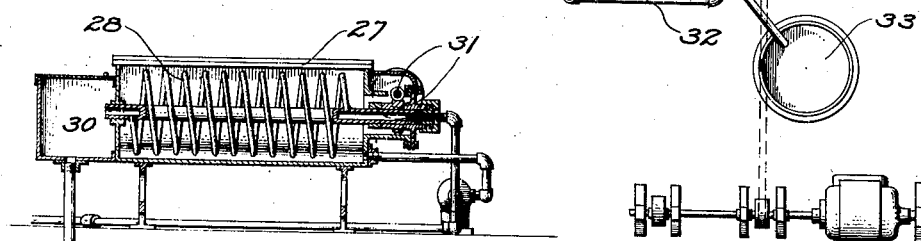

March 16, 1926.  
E. E. LINDSEY ET AL  
MANUFACTURE OF BREAD COMPOUND  
Filed Feb. 11, 1925

Inventor  
Ernest E. Lindsey  
and Patrick J. Shortt  
By Dewey, Strong, Townsend & Loftus  
Attorneys Patented Mar. 16, 1926.

1,576,664

UNITED STATES PATENT OFFICE.

ERNEST E. LINDSEY AND PATRICK J. SHORTT, OF SAN FRANCISCO, CALIFORNIA.

MANUFACTURE OF BREAD COMPOUND.

Application filed February 11, 1925. Serial No. 8,391.

*To all whom it may concern:*

Be it known that we, ERNEST E. LINDSEY and PATRICK J. SHORTT, citizens of the United States, residing in the city and county of San Francisco and State of California, have invented new and useful Improvements in the Manufacture of Bread Compound, of which the following is a specification.

This invention relates to a method of and apparatus for the manufacture of a bread-making compound such as is shown in our Patent Number 1,493,685, issued May 13, 1924.

In said patent there is disclosed a compound consisting of the usual ingredients of bread, except the yeast and flour, prepared in the form of a cooked, gelatinous mixture. This composition is now being manufactured commercially by our licensees. For the economical and suitable production of this compound we have devised the present method and apparatus, which comprises a novel form of gelatinizer, employing live steam for cooking the preparation. The salt, sugar, and milk components are initially mixed together, and after thorough stirring or agitation are transferred to the gelatinizer. Here the said milk, sugar, and salt components are initially heated by the introduction of live steam, and thereafter the starch component is introduced and mixed with the other ingredients. This mixture is continuously circulated in the gelatinizer, and steam is admitted to raise the temperature thereof to a point near the cooking temperature. As a final step the shortening or fat component is added to the mixture, such shortening or fat having been given a preliminary heating before being added to the other ingredients in the gelatinizer. When the mixture has been sufficiently cooked and converted into gelatinous form, it is drawn off through a cooler and packaged.

In the accompanying drawings, a form of apparatus suitable for practising our method is shown.

Fig. 1 is a plan view of the apparatus.

Fig. 4 shows a detail sectional view of the cooler.

Figure 2:
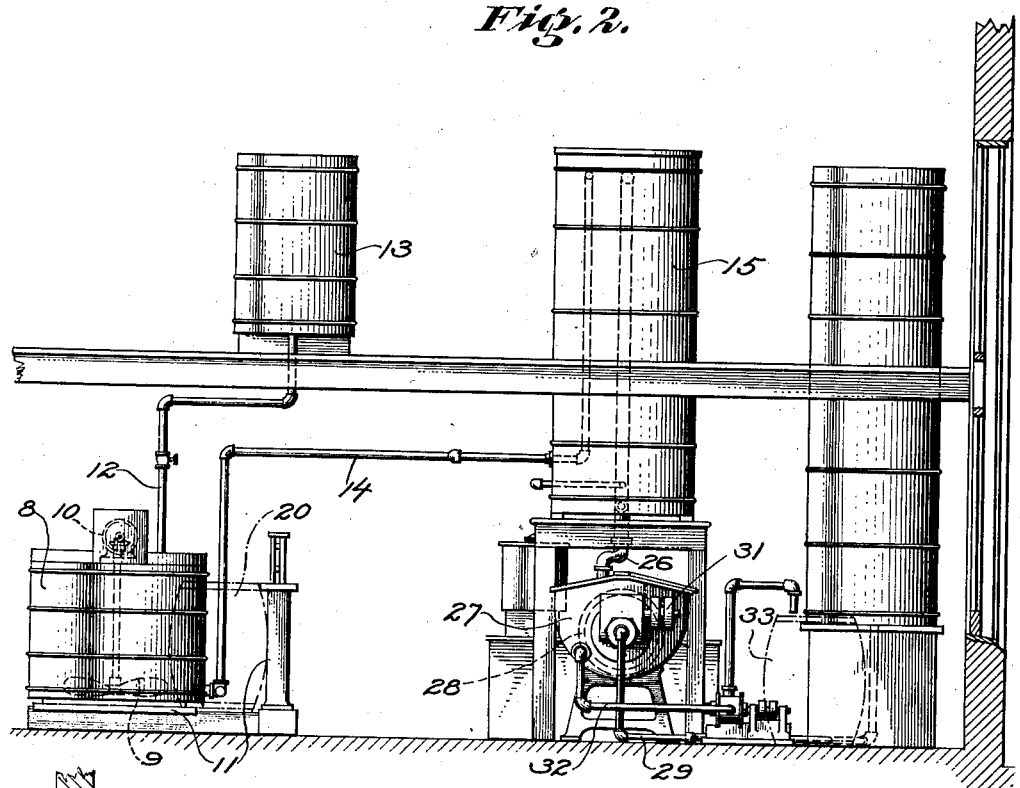
Fig. 2 is a side elevation thereof.
Figure 3:
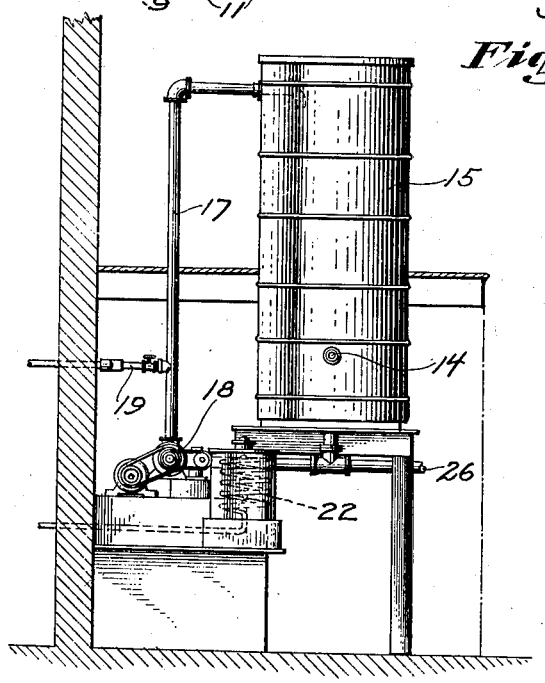
Fig. 3 is a side elevation of the gelatinizer, taken at right angles to the view of Fig. 2.

Referring in detail to the arrangement shown in the accompanying drawings, it will be seen that we have provided a vessel 8, fitted with an agitator 9, driven by a motor 10. This agitator is preferably placed upon a scale 11, for convenience in weighing the various ingredients introduced therein. There is a pipe connection 12 for supplying water to the vessel 8 from a storage tank 13. A pipe connection 14 leads from the vessel 8 to a gelatinizing tank 15. Where gravity can not be taken advantage of for transferring materials from the vessel 8 to the tank 15, we provide a pump 16, suitably connected with a motor 10ª.

The pipe 14 preferably enters near the top of the tank 15, and there is provided a circulating pipe 17, leading from the bottom of the tank 15 to a point near the top thereof, said circulating pipe being provided with a pump 18 for circulating the material therethrough. There is a steam pipe 19 opening into the pipe 17, whereby live steam is admitted to the mixture undergoing circulation, so as to raise the temperature thereof and produce a cooked compound.

A barrel 20 is provided to receive a prepared starch solution, and this barrel is suitably connected with the pump 16 and pipe line 14, so that the contents of the barrel may be transferred at the proper time to the tank 15. There is also a separate vessel 21 to receive the shortening or fat used in the manufacture of this compound, said vessel 21 being provided with a steam coil 22 for initially heating the fat. This vessel 21 has a discharge pipe 23 connected with a pump 24, and from the pump a pipe line 25 leads to the pump 18.

Connected with the bottom of the tank 15 is a discharge pipe 26 leading to a cooling tank 27. Rotatably mounted within this tank is a cooling coil 28 having a connection at one end with a water supply pipe 29, and discharging at the other end into a drain compartment 30. Suitable driving connections 31 are provided for rotating the coil 28, so as to increase the cooling capacity thereof. By means of a pipe 32 and pump 33 the material is drawn from the cooling tank 27 and pumped into the barrels or containers 33 for final packaging.

In commercial practice the compound usually consists of the following ingredients in approximately the proportions mentioned, to-wit:

| | |
|---|---|
| Salt | 15% to 16% |
| Sugar | 15% to 16% |
| Powdered milk | 3% to 5% |
| Starch | 7% to 8% |
| Shortening | 7% to 8% |
| Water | 50% to 60% |

In practicing the present method, the required amount of water is put in the vessel 8 and the salt, sugar, and milk ingredients are separately introduced into the vessel 8 and weighed. The agitator 9 is put in operation and continued until the ingredients are properly dissolved and mixed. Thereafter the contents of the vessel 8 are transferred to the gelatinizing tank 15, where they are circulated, being drawn from the bottom of the tank and returned to the top thereof through the pipe 17. During this stage steam is admitted to the pipe 17 until the temperature of the contents of the tank reaches approximately 180° Fahrenheit. Meantime, a starch solution has been prepared in the barrel 20, and this is now transferred to the gelatinizing tank 15. Circulation of the contents of the tank 15 is continued, and steam is admitted until all of the ingredients are thoroughly mixed and gelatinized, which occurs at a temperature of approximately 200° Fahrenheit. The admission of steam should be carefully regulated, so as to prevent excessive foaming of the mixture. When the mixture is sufficiently cooked and has assumed a gelatinized form, the fat or shortening is added thereto. This fat has previously been liquefied by heating in the vessel 21 to a temperature of approximately 140° Fahrenheit. After the fat is added to the mixture in the tank 15, circulation of the contents is continued, preferably without admitting any more steam, and this is kept up until the fat is thoroughly incorporated in the mixture. Thereafter the mixture is discharged into the cooling tank 27, and water passed through the coil 28, the coil being meanwhile rotated. Here the mixture will harden slightly, but remains sufficiently fluid so as to be drawn off by the pump 32 and delivered into barrels or packages for storage and shipment. The rotating coil will act as a screw to move the mixture towards the discharge end of the tank 27.

It has been found that the foregoing steps give the best results in the preparation of a compound of the character indicated in our prior patent above mentioned. Especially is it important to add the starch solution after preliminary mixing and heating of the sugar, salt and milk mixture, as otherwise explosion of the starch cells is retarded and a cloudy mixture results. Likewise, it is important to introduce the fat or shortening after all of the other ingredients have been properly cooked, mixed, and gelatinized, since the fat tends to retard gelatinization and prevents explosion of the starch cells, with the result that small, undissolved particles are left in the mixture. The use of live steam admitted to the mixture while undergoing circulation in the gelatinizing tank is of great advantage, for the reason that indirect heat would result in causing the material to cake or form a crust on the heated walls of the tank or upon the walls of any heating coils that might be placed within the tank. Furthermore, the steam supplies moisture to maintain the mixture at the proper consistency.

It will be understood, of course, that various changes in the order of the several steps, and particularly in the arrangement and construction of the apparatus herein described, may be employed without departing from the spirit of our invention as disclosed in the appended claims.

What we claim as new and desire to secure by Letters Patent is:

1. A method of producing a bread compound of the character indicated, which consists of first dissolving, mixing, and heating sugar, salt, and milk, adding a starch solution thereto, and continuing the mixing and heating until gelatinization takes place, and thereafter adding a liquid shortening and combining the same with the other ingredients.

2. A method of producing a bread compound of the character indicated, which consists of first dissolving and mixing sugar, salt, and milk, adding a starch solution thereto, heating the mixture by the admission of steam directly thereto while circulating the same in a vessel, and thereafter combining a liquid shortening therewith.

3. A method of producing a bread compound of the character indicated, which consists of dissolving and mixing sugar, salt and milk, subjecting the same to the action of steam while circulating the mixture in a vessel, adding a starch solution thereto, and continuing the admission of steam and circulation of the mixture until complete gelatinization takes place, and thereafter incorporating a liquid shortening.

ERNEST E. LINDSEY.
PATRICK J. SHORTT.